Aug. 3, 1965   W. F. ALLER   3,197,873
GAGING DEVICE

Filed Dec. 16, 1963   2 Sheets-Sheet 1

INVENTOR.
WILLIS FAY ALLER
BY Ernest J. Hy
ATTORNEY

United States Patent Office 3,197,873
Patented Aug. 3, 1965

3,197,873
GAGING DEVICE
Willis Fay Aller, Dayton, Ohio, assignor to The Sheffield Corporation, Dayton, Ohio, a corporation of Delaware
Filed Dec. 16, 1963, Ser. No. 330,868
10 Claims. (Cl. 33—147)

This invention relates to gages and more particularly to gages of the comparator type for the precision measurement of dimensions or characteristics of a workpiece.

In precision measuring instruments, for example of the laboratory type, it is necessary to provide extremely accurate measurements; however, in order to remain commercially competitive the instruments must be produced and sold at a reasonable cost. Many current instruments compromise either accuracy or reasonable cost to achieve marketability.

Accordingly it is one object of this invention to provide a simple and durable precision measuring instrument at an economical cost.

Another object of this invention is to provide a measuring instrument which is simpler in construction and arrangement then prior such instruments having features making possible more economical manufacture yet with precision capability, easy and rapid adjustment, and ready accessibility of operating components thereby permitting the instrument to be used more efficiently and by less experienced operators without sacrificing accuracy of gaging results.

Another object of this invention is the provision of a gage having relatively cooperating gaging elements for operative association with the workpiece, said gaging elements having optimum positions or ranges of movement during gaging, and gage means associated with each gaging element for predetermining and positioning said elements within their optimum positions or ranges for operative association with said workpiece.

Figure 1:
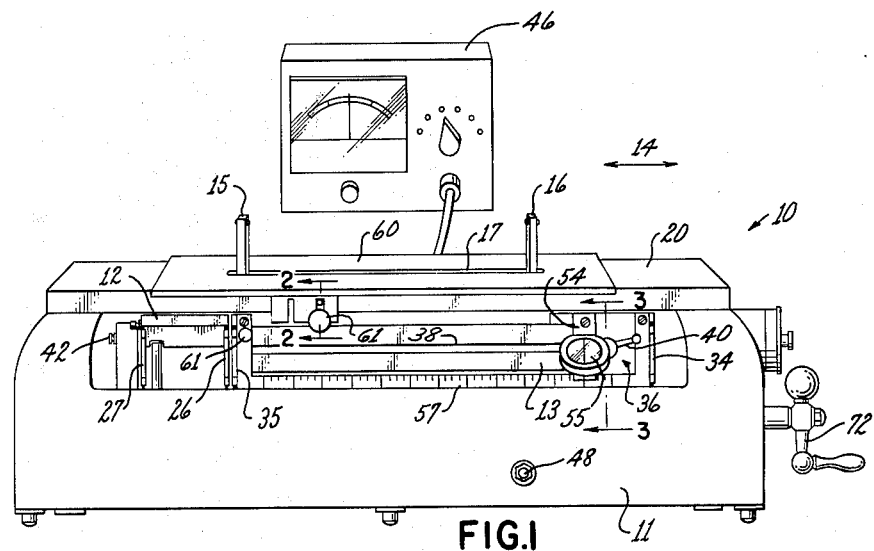
Figure 2:
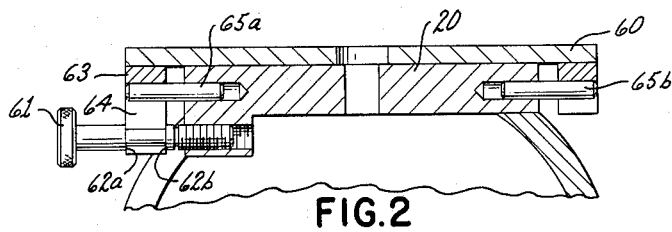
Figures 3, 4:
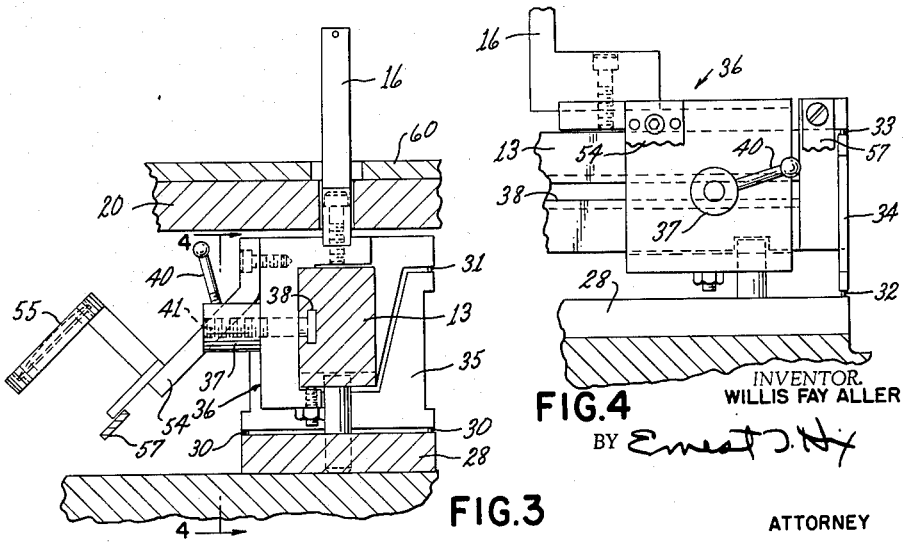
Figure 5:
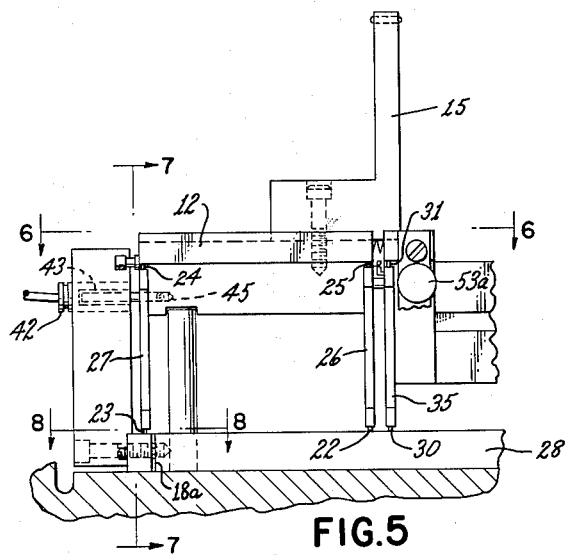
Figure 8:
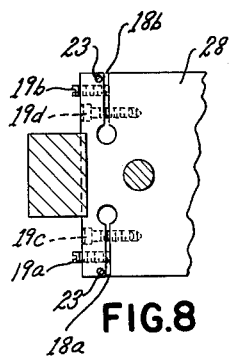
Figure 6:
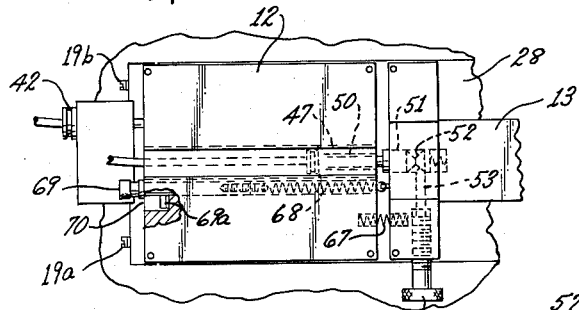
Figure 7:
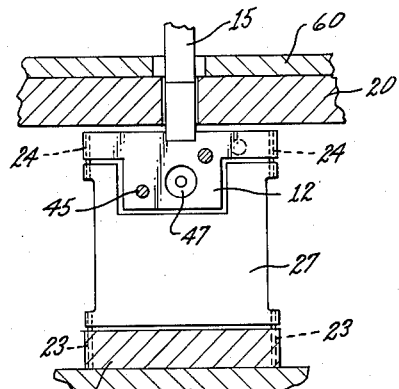
Figure 9:
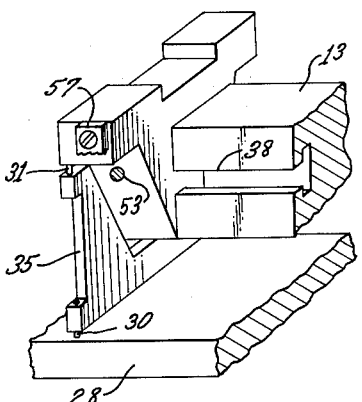

Other objects and advantages of the invention will be apparent from the following description, the appended claims, and the accompanying drawings, in which, FIG. 1 is a perspective view of an exemplary embodiment of the invention in a gage for measuring internal and external dimensions of workpieces, FIG. 2 is a view on the line 2—2 of FIG. 1 illustrating details of the transverse adjustment for the workpiece supporting platform, FIGS. 3 and 4 are sectional views taken respectively on line 3—3 of FIG. 1 and 4—4 of FIG. 3 illustrating a portion of the carrier for one of the gaging arms, FIG. 5 is an enlarged front view of the other gaging arm and its associated structure, FIGS. 6, 7, and 8 are sectional views taken respectively on lines 6—6, 7—7, and 8—8 of FIG. 5, and FIG. 9 is a perspective view of a further portion of the supporting structure for the adjustable gaging arm in this illustrated embodiment.

FIG. 1 shows the invention in an exemplary embodiment as applied to a gage 10 of the comparator type used for measuring internal and external dimensions of a workpiece, such as a ring gage or the like. A base 11 mounts a first support or block 12 and a second elongated support or block 13 which are carried on the base for limited yielding movements in a gaging direction depicted by line 14. Blocks 12 and 13 carry first and second gaging elements or arms 15 and 16 respectively which extend through a slot 17 in a workpiece supporting table 20 for engaging a workpiece carried thereby.

Means are provided for mounting block 12 on base 11 for limited yielding movements and includes parallel sets of flexible interconnections illustrated as pairs of rods 22, 23, 24, and 25, of equal effective length, fastened in pairs to opposite ends of parallel plate members 26 and 27 and in turn to a member 28 fixed to base 11 and block 12, as illustrated in FIG. 5. Similarly, means are provided supporting the second elongated support or block 13 on base 11 for limited yielding movement which includes, as illustrated in FIGS. 4, 5, and 9, parallel sets of flexible pairs of rods 30, 31, 32, and 33 fastened to parallel plates 34 and 35 and in turn to member 28 on base 11 and block 13. The rods and plates carry blocks 12 and 13 for substantially rectilinear movement in the gaging direction with minor pivoting movement with respect to base 11 while maintaining blocks or supports 12 and 13 and the gaging arms they carry parallel thereto.

Adjustable means are provided as illustrated in FIG. 8 for selectively aligning rod pair 23 to assure non-rotary movement of block 12 relative to base 11. The adjustable means includes slots 18a and 18b in member 28 and cooperating screws 19a, 19b, 19c, and 19d screwed in member 28. The relative position of the rods in pair 23 is easily displaced by adjusting the screws to assure a smooth rectilinear motion of block 12 with respect to base 11. If desired an arrangement of this type may be used for the rod pairs of block 13.

Instrument 10 is open along one entire side thereof for ready accessibility during operation, adjustment, and maintenance. This includes accessibility of block 12 and particularly block 13 with its associated components.

In the illustrated embodiment gaging arm 15 is fixed to block 12 and moves therewith during flexing movements of block 12, for example, as arm 15 engages the workpiece. A manually adjustable carrier 36, shown particularly in FIG. 4, is mounted on block 13 and gaging arm 16 is fixed thereto and movable therewith. Means are provided for adjustably clamping carrier 36 to block 13 at preselected positions therealong which include a nut 37 provided with a handle 40 and threaded onto a T bolt 41, the head of which is slidable along a T slot 38 extending along the length of block 13. Bolt 41 extends through carrier 36 and also moves therewith as the carrier slides along block 13. Carrier 36 and gaging arm 16 may be clamped at any desired position along block 13 merely by tightening nut 37.

In a gage of this type it is desirable to operate with gaging arms 15 and 16 as close as practically possible to a vertical position in their gaging movement to assure that gaging pressure will be kept at a minimum and linearity problems throughout the entire gaging range minimized. To establish a reference vertical or fiducial position for arm 15 first gaging means such as a cartridge 42, shown particularly in FIG. 5, is provided cooperating between block 12 and an extended portion of base 11 to provide a signal which is infinitely responsive to the position of block 12 and of arm 15 carried thereby with respect to base 11. Cartridge 42 in this exemplary application is of a differential transformer type such as is described in Patent No. 2,833,046, in which an electrical gaging signal is provided without physical contact between two relatively movable members. Cartridge 42 has as a component an electrical field portion 43 fixed to base 11 and an inner component member or armature 45 fixed to block 12 extending into gaging association within field 43 to provide an infinitely variable signal of their relative positions.

The signal from cartridge 42 is displayed on indicating means such as electrical instrument 46, shown in FIG. 1, to give an infinite indication of the relative position of the gaging components and hence the position of arm 15 from its fiducial position.

Second gaging means, including cartridge 47, shown in FIG. 6, and of the type previously mentioned, provides a gaging signal which is infinitely responsive to the relative displacement of blocks 12 and 13 and hence of the dimensions of workpiece engaged by gaging arms 15 and 16 respectively clamped to these blocks. Cartridge 47 includes a gaging component or electrical field 50 which in the illustrated embodiment is mounted on block 12 and another gaging component or armature 51 adjustably mounted on block 13. The signal from cartridge 42 is selectively provided to instrument 46 upon manual depression of control button 48 for indicating the position of arm 15 and the signal from cartridge 47 is provided to instrument 46 upon release of that button for indicating the workpiece dimension.

Means for adjusting armature 51 with respect to field 50 includes V shaped groove 52 in the stem for armature 51 for engagement by a cooperating V shaped end of a bolt 53. Armature 51 is spring urged in one direction and as bolt 53 is screwed in and out by turning knob 53a, the signal from cartridge 47 to instrument 46 is changed while keeping gaging arm 16 and block 13 stationary.

As illustrated in FIGS. 1 and 3, carrier 36 also carries a position indicator thereon including a bracket 54 fixed thereto which has a magnifying glass 55 with a scribed line thereon and which cooperates with markings on a linear scale 57 fixed at each end to and extending along block 13. Scale 57 is used to visually indicate the displacement of gaging arm 16 with respect to arm 15 thus making it possible to manually and rapidly set gaging element 16 at the approximate position which represents the size of a gaging master and then after clamping carrier 36 in position, indicator 46 is set at a desired null position as previously described.

As illustrated in FIGS. 2 and 7, work supporting table 20 has a work supporting platform or plate 60 mounted thereon for workpiece positioning in a direction transverse the gaging direction. This transverse positioning arrangement is provided to assure that the workpiece is moved to a maximum or minimum dimension which is being measured without further physical contact of the part thereby assuring more accurate measurements. The transverse positioning arrangement includes a rotatable knob 61 having a screw portion which threads into worktable 20 and shoulders 62a and 62b which engage a projection 63 in plate 60. To assure that plate 60 does not skew during transverse adjustment, guide pin means, including pins 65a and 65b and a cooperating slot 64 in projection 63 aligns and guides plate 60 with respect to table 20.

Gage 10 has considerable versatility and can include gaging arms having contactors at either side or arms provided for internal or external measurements thus enabling the measurement of workpieces both internally and externally. Referring particularly to FIG. 6, during measurement of internal dimensions, for example, compression spring means including spring 67 mounted between blocks 12 and 13 exerts forces to relatively separate the blocks and hence gaging arms 15 and 16 from each other. If it is desired to measure external dimensions, for example, a tension spring 68 is mounted at one end to block 13 and at its opposite end to manually adjustable means including selector 69 mounted on block 12. Selector 69 has a pin 69a thereon and during external measurements selector 69 is pulled out and rotated so pin 69a engages shoulder 70 of block 12 thereby overriding spring 67 and urging gaging arms 15 and 16 toward each other. Spring 68 is illustrated in a disabled position with pin 69a resting in a recess in block 12 thereby permitting spring 67 to relatively separate blocks 12 and 13 as previously described for internal measurements.

To accommodate workpieces of different sizes and to assure that the gaging elements in each instance contact a part being measured at the desired position a hand crank 72 is provided for moving the work supporting table up and down with respect to base 11. A scale may also be fixed to worktable 20 to enable prepositioning thereof at a desired height prior to placing a workpiece thereon, thereby resulting in more efficient operations.

As previously mentioned, it is desirable for most accurate gaging results that both gaging arms and their supporting structures operate substantially vertically in their gaging movements. Features are provided which make this possible without relying on operator skill or judgment. Arm 15 is so positioned by positioning the workpiece thereagainst while observing instrument 46 connected to cartridge 42 until a nominal indication is obtained. Through use of glass 55 and scale 57 carrier 36 and gaging arm 16 can be adjusted along support block 13 relative to arm 15 to a nominal workpiece spacing therebetween to insure that arm 15 is close to its vertical position during gaging. Adjustment through knob 53a enables the obtaining of a nominal indication on the instrument with a reference master in gaging position.

Thus it is seen that a measuring instrument is provided which is of simple and durable construction yet applicable to extremely precise measurements, and having features permitting operation by inexperienced operators without sacrificing accuracy of gaging results.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gage for measuring dimensions of a workpiece comprising,
    a base,
    a first support,
    means mounting said first support on said base for limited yielding movements in a gaging direction,
    a first gaging element fixed to said first support for movement therewith,
    a second elongated support which is readily accessible from one side throughout its length,
    means mounting said second support on said base for limited yielding movements in said gaging direction and relative to said first support,
    a second gaging element,
    a carrier on said second support mounting said second gaging element for movement in said gaging direction relative to said first gaging element,
    means for clamping said carrier at a selected position along said elongated second support for gaging workpieces of different sizes associated with said first and second gaging elements,
    a workpiece supporting table on said base for carrying a workpiece in gaging association with said gaging elements,
    first gaging means cooperating between one of said supports and said base providing a gaging signal infinitely responsive to the position of said one support and of the gaging element carried thereby with respect to said base,
    second gaging means cooperating between said first and second supports providing a gaging signal infinitely responsive to the relative positions of said supports and the dimension of a workpiece engaged by said gaging elements,
    indicating means operatively responsive to said gaging means providing an indication infinitely responsive thereto,
    and control means for placing said indicating means in operative connection with said first gaging means for indicating the reference position of said first gaging element and with said second gaging means for indicating the workpiece dimension.

2. A gage as set forth in claim 1 in which each of said mounting means includes flexible interconnections of equal effective length carrying the respective support for substantially rectilinear movement with minor pivoting relative to said base while maintaining the respective support parallel thereto, and further comprising adjustable means for relatively aligning said interconnections of at least one of said mounting means to obtain non-rotary movement of the respective support relative to said base.

3. A gage as set forth in claim 1 in which said second gaging means includes cooperating gaging components respectively carried by said first and second supports,
 means fixedly mounting one of said gaging components to one of said supports,
 and means adjustably mounting the other of said gaging components on the other of said supports.

4. A gage as set forth in claim 1 further comprising compression spring means acting between said supports for relative separation thereof for internal measurements,
 a tension spring connected at one end to one of said supports,
 and manually adjustable means on the other of said supports connected to the other end of said tension spring for selectively placing said tension spring under tension and overriding said compression spring for relatively urging said supports together for external measurements and disabling said tension spring for internal measurements.

5. A gage as set forth in claim 1 wherein said workpiece supporting table includes a work supporting platform movable transverse the gaging direction for workpiece positioning,
 a rotatable knob threaded for transverse adjustment relative to said base,
 interconnection means between said knob and said platform for transverse movement of said platform upon rotation of said knob,
 and means for guiding said platform in its transverse adjustment.

6. A gage for measuring dimensions of a workpiece comprising,
 a base,
 a first support,
 means mounting said first support on said base for limited yielding movements in a gaging direction,
 a first gaging element fixed to said first support for movement therewith,
 a second elongated support,
 said base having an opening therein extending along said second support through which said second support is readily accessible from one side throughout its length,
 means mounting said second support on said base for limited yielding movements in said gaging direction and relative to said first support,
 each of said mounting means including a plurality of flexible interconnections of equal effective length carrying the respective support for substantially rectilinear movement with minor pivoting relative to said base while maintaining the respective support parallel thereto,
 a second gaging element,
 a manually adjustable carrier on said second support mounting said second gaging element for movement in said gaging direction relative to said first gaging element,
 means for clamping said carrier at a selected position along said readily accessible second support for gaging workpieces of different sizes associated with said first and second gaging elements,
 a workpiece supporting table on said base for carrying a workpiece in gaging association with said gaging elements,
 a visual linear scale,
 means carrying said scale on said base and extending along said second support,
 a position indicator fixed to said carrier for cooperation with said linear scale to enable desired relative positioning of said second gaging element relative to said first gaging element as determined by the nominal dimension of the workpiece being measured,
 a first gaging means cooperating between said first support and said base providing a gaging signal infinitely responsive to position of said selected support and of the gaging element carried thereby with respect to said base,
 second gaging means cooperating between said first and second supports providing a gaging signal infinitely rsponsive to the relative positions of said supports and the dimension of a workpiece engaged by said gaging elements,
 and indicating means operatively responsive to said gaging means.

7. A gage as set forth in claim 6 wherein said means carrying said scale includes means mounting said scale fixedly to said second support.

8. A gage for measuring dimensions of a workpiece comprising,
 a base,
 a first support,
 means mounting said first support on said base for limited yielding movements in a gaging direction,
 a first gaging element fixed to said first support for movement therewith,
 a first gaging means cooperating between said first support and said base providing a gaging signal infinitely responsive to the position of said first support relative to said base and thus enable positioning of said first gaging element to a reference position relative to said base,
 a second elongated support readily accessible from one side throughout its length,
 means mounting said second support on said base for limited yielding movements in said gaging direction and relative to said first support,
 a second gaging element,
 a carrier manually adjustable along said second support mounting said second gaging element for movement in said gaging direction relative to said first gaging element,
 means for clamping said carrier at a selected position along said elongated second support for gaging workpieces of different sizes associated with said first and second gaging elements,
 a workpiece supporting table on said base for carrying a workpiece in gaging association with said gaging elements,
 a visual linear scale extending lengthwise of said second support and readily visible along said accessible side,
 a position indicator fixed to said carrier cooperating with said linear scale to enable desired relative positioning of said carrier and second gaging element relative to said first gaging element as determined by the nominal dimension of the workpiece being measured and with said first gaging element in its reference position,
 first gaging means cooperating between said first support and said base providing a gaging signal infinitely responsive to movements of said first support and of the gaging element carried thereby relative to a reference position with respect to said base,
 second gaging means cooperating between said first and second supports providing a gaging signal infinitely responsive to the relative positions of said supports in said gaging direction and the dimension of a workpiece engaged by said gaging elements,
 indicating means operatively responsive to said gaging means providing an indication infinitely responsive thereto,
 and control means for placing said indicating means in operative connection with said first gaging means for indicating the reference position of said first gaging element and with said second gaging means for indicating the workpiece dimension.

9. A gage for measuring dimensions of a workpiece comprising, a base, a first support, means mounting said first support on said base for limited yielding movements in a gaging direction, a first gaging element fixed to said first support for movement therewith, a second elongated support readily accessible from one side throughout its length, means mounting said second support on said base for limited yielding movements in said gaging direction relative to said first support, a second gaging element, a carrier manually adjustable on said second support mounting said second gaging element for movement in said gaging direction relative to said first gaging element, means for clamping said carrier at a selected position along said elongated second support for gaging workpieces of different sizes associated with said first and second gaging elements, a workpiece supporting table on said base for carrying a workpiece in gaging association with said gaging elements, a visual linear scale carried on the base and extending along said second support, a position indicator fixed to said carrier cooperating with said linear scale to enable positioning of the second gaging element to the approximate size of the dimension being measured and with said first gaging element in its reference position, a first gaging means cooperating between said first support and said base providing a gaging signal infinitely responsive to movements of said first support and of the gaging element carried thereby relative to a reference position with respect to said base, second gaging means cooperating between said first and second supports including cooperating gaging components respectively carried thereby providing through their relative movements a gaging signal infinitely responsive to the relative positions of said supports and the dimension of a workpiece engaged by the gaging elements carried thereby, indicating means operatively responsive to said gaging means providing an indication infinitely responsive thereto, and manually adjustable means on one of said supports for positioning the associated one of said gaging components relative to said one support and the other of said gaging components during setup to obtain a desired indication of said indicating means with a workpiece of known dimension in gaging position.

10. A gage for measuring dimensions of a workpiece comprising, a base, a first support, means mounting said first support on said base for limited yielding movements in a gaging direction, a first gaging element fixed to said first support for movement therewith, a second elongated support readily accessible from one side throughout its length, means mounting said second support on said base for limited lengthwise yielding movements in said gaging direction relative to said first support, a second gaging element, a carrier manually adjustable on said second support mounting said second gaging element for movement in said gaging direction relative to said first gaging element, means for clamping said carrier at a selected position along said elongated second support for gaging workpieces of different sizes associated with said first and second gaging elements, a workpiece supporting table mounted generally parallel to said base having a slot therein extending along said gaging direction through which said gaging elements extend into gaging association with a workpiece carried on said table, a visual linear scale carried on the base and extending along said second elongated support, a position indicator fixed to said carrier cooperating with said linear scale to enable positioning of the second gaging element to the approximate size of the dimension being measured, a first gaging means cooperating between said first support and said base providing a gaging signal infinitely responsive to movements of said first support and the position of the gaging element carried thereby relative to a reference position with respect to the base, second gaging means cooperating between said first and second supports including cooperating gaging components respectively carried thereby providing through their relative movements a gaging signal infinitely responsive to the relative positions of said supports and the dimension of a workpiece engaged by the gaging elements carried thereby comprising, means fixedly mounting one of said gaging components on one of said supports, means adjustably mounting the other of said gaging components on the other of said supports, indicating means operatively responsive to the relative positions of said gaging components providing an indication infinitely responsive thereto, means for adjusting said adjustable gaging component to change the gaging signal while keeping the gaging element in gaging contact with a standard size workpiece to thereby position the indicating means to a suitable base point, and control means for placing said indicating means in operative connection with said first gaging means for indicating the reference position of said first gaging element and with said second gaging means for indicating the deviation of the workpiece from said base point.

References Cited by the Examiner

UNITED STATES PATENTS 2,412,421   12/46   Polk et al. _____ 33—147

FOREIGN PATENTS 617,604   2/49   Great Britain.

ISAAC LISANN, *Primary Examiner.*